(12) United States Patent
Gódor et al.

(10) Patent No.: US 9,647,934 B2
(45) Date of Patent: May 9, 2017

(54) HANDLING OF INFORMATION RELATED TO OFF-LINE BASE STATIONS

(71) Applicant: Telefonaktiebolaget L M Ericsson (publ), Stockholm (SE)

(72) Inventors: István Gódor, Budapest (HU); Pål Frenger, Linköping (SE); Magnus Olsson, Uppsala (SE); Yngve Selén, Uppsala (SE); Hugo Tullberg, Nyköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/436,320

(22) PCT Filed: Oct. 22, 2013

(86) PCT No.: PCT/EP2013/072086
§ 371 (c)(1),
(2) Date: Apr. 16, 2015

(87) PCT Pub. No.: WO2014/064113
PCT Pub. Date: May 1, 2014

(65) Prior Publication Data
US 2015/0271063 A1    Sep. 24, 2015

Related U.S. Application Data

(60) Provisional application No. 61/717,159, filed on Oct. 23, 2012.

(51) Int. Cl.
*H04M 11/04* (2006.01)
*H04L 12/703* (2013.01)
*H04W 88/04* (2009.01)
*H04W 24/04* (2009.01)
*H04W 4/22* (2009.01)

(52) U.S. Cl.
CPC ............... *H04L 45/28* (2013.01); *H04W 4/22* (2013.01); *H04W 24/04* (2013.01); *H04W 88/04* (2013.01)

(58) Field of Classification Search
CPC ....... H04W 88/04; H04W 4/22; H04W 24/04; H04L 45/28
USPC .......................................... 455/404.1, 404.2
See application file for complete search history.

(56) References Cited

U.S. PATENT DOCUMENTS

| 2007/0218868 | A1 | 9/2007 | Schefczik et al. |
| 2010/0279647 | A1 | 11/2010 | Jacobs et al. |
| 2011/0111726 | A1 | 5/2011 | Kholaif et al. |
| 2011/0124312 | A1 | 5/2011 | Kwon et al. |

OTHER PUBLICATIONS

International Search Report for International application No. PCT/EP2013/072086, Mar. 25, 2014.

*Primary Examiner* — Charles Shedrick
(74) *Attorney, Agent, or Firm* — Baker Botts, LLP (57) ABSTRACT

A method is provided in an access point (800) in a wireless communication system. When the access point temporarily does not have an operational backhaul connection (601), the access point receives information from a terminal. The access point provides the information to a messenger (604; 605) for mechanical relaying to a service area of an access point having an operational backhaul connection.

16 Claims, 10 Drawing Sheets

HANDLING OF INFORMATION RELATED TO OFF-LINE BASE STATIONS

PRIORITY

This nonprovisional application is a U.S. National Stage Filing under 35 U.S.C. §371 of International Patent Application Serial No. PCT/EP2013/072086, filed Oct. 22, 2013, and entitled "*Handling of Information Related to Off-Line Base Stations*" which claims priority to U.S. Provisional Patent Application No. 61/717,159 filed Oct. 23, 2012, both of which are hereby incorporated by reference in their entirety.

TECHNICAL FIELD

The present disclosure relates to handling of information by an access point of a wireless communication system, which does not have an operational backhaul connection.

BACKGROUND

A communication system for national security and public safety need to achieve two basic requirements: area coverage and reliability. Both these requirements can be a matter of life and death in an emergency situation. The system must provide coverage where an accident occurs, which may be anywhere. This will require coverage to be extended into sparely populated areas and wilderness areas that today often have no coverage. In Europe the population coverage of 3G is in the order of 80-90% while the area coverage is hardly 40%. To provide the ubiquitous coverage required by a NSPS (National Security and Public Safety) system, a large number of base stations must be deployed in remote areas.

In remote areas it will be difficult to provide system backhaul at a reasonable cost. Digging down fiber to every new base station in the wilderness will be impossible so backhaul will to a large extent have to be wireless. This will make the backhaul connection less reliable since e.g. a heavy storm can cut off the remote base station from the network temporarily. At the same time we know that accidents typically happen, and thereby the need for reliable emergency services is most important, when the weather is bad. Hence, for a NSPS system it is not acceptable to rely only on e.g. a single microwave backhaul connection that might stop working during a heavy rainfall.

The OSS (Operations Support Systems) of the mobile network is capable of detecting if a base station lost its connection to the rest of the network. In such a case, the OSS system first tries to resolve the problem via configuration, if it does not help, then operational/technician team should go to the site to recover the connections of the faulty offline base station. This procedure takes far too long time to be useful in an emergency situation. To fix base stations in remote areas where the traffic is low typically has low priority and it can take several days before the problem is resolved.

When a base station has lost its connection to the rest of the mobile network users cannot send emergency calls/messages, even if the particular base station is at least partially in operation. The suggested technology disclosed here aim to resolve this problem.

SUMMARY

An offline base station is enabled to collect and store user-initiated data, such as e.g. voice messages, Short Message Service (SMS), etc, during the time it is being offline, and forward this data to the network via a "messenger". A "messenger" could be a user equipment (UE) connected to the base station, or some other entity capable of carrying the data, in particular emergency messages, until having moved into (being in) the service area of a base station with operational backhaul connections.

According to a first aspect, a method is provided, which is to be performed by a base station or other access point in a wireless communication system. The method comprises, when in off-line mode, receiving information from a UE; and providing the information to a messenger, for mechanical relaying to a service area of a base station or other access point having an operational backhaul connection.

This allows information, e.g. emergency messages, to be transmitted even when the backhaul connection of the base station serving the UE is not operational.

According to a second aspect, a base station (access point) is provided, which comprises a functional unit for, when the base station is in off-line mode, receiving information from a UE. The base station further comprises a functional unit for providing the information to a messenger for mechanical relaying to a service area of a base station or other access point having an operational backhaul connection.

According to a third aspect, a method is provided, which may be performed by a UE when served by an off-line base station. The method comprises receiving information from the base station, and keeping and carrying the information until, at a later point in time, the information may be transmitted to an on-line base station (access point). The information may be transmitted to such a base station upon the entering into the service area of said base station.

According to a fourth aspect, a UE is provided, operable to be served by a base station. The UE comprises a functional unit adapted to, when served by an off-line base station, receiving information, e.g. an emergency message, from the off-line base station. The UE further comprises a functional unit for keeping said information until having moved into a service area of a base station having an operational backhaul connection (being on-line). The UE further comprises a functional unit for transmitting the information to the on-line base station when having moved into the service area of said on-line base station.

According to a fifth aspect, a computer program is provided, comprising code, which when executed in a processing unit, causes a base station to perform the method according to the first aspect.

According to a sixth aspect, a computer program product is provided comprising a computer program according to the fifth aspect.

According to a seventh aspect, a computer program is provided, comprising code, which when executed in a processing unit, causes a UE to perform the method according to the third aspect.

According to an eight aspect, a computer program product is provided comprising a computer program according to the seventh aspect.

In a further aspect, a method is provided of an access point in a wireless communication system. When the access point temporarily does not have an operational backhaul connection, the access point stores information from a terminal and/or the access point provides information to one or more terminal or messenger.

In a further aspect, an access point is provided for a wireless communication system. The access point comprising one or more functional units arranged, when the access point temporarily does not have an operational backhaul connection, to store information from a terminal and/or provide information to one or more terminal or messenger.

In a further aspect, a method is provided of an access point in a wireless communication system. The method comprises storing user initiated data when the access point temporarily does not have an operational backhaul connection. When the backhaul connection is restored, the method comprises forwarding some or all of the stored messages using the backhaul connection. In some examples, if the backhaul connection is not restored within a pre-defined time, one or more further actions may be taken by the access point, e.g. providing information for mechanical relaying.

In a further aspect, an access point in a wireless communication system comprises a storage unit for storing user initiated data when the access point temporarily does not have an operational backhaul connection. When the backhaul connection is restored, the access point is arranged to forward some or all of the stored messages using the backhaul connection.

In a further aspect, a method is provided of an access point in a wireless communication system. The method comprises receiving information from a terminal, when the access point temporarily does not have an operational backhaul connection. The method further comprising providing the received information from the terminal to other terminals connected to the same access point.

In a further aspect, an access point in a wireless communication system comprises a receiving unit arranged to receive information from a terminal. When the access point temporarily does not have an operational backhaul connection, the control unit is adapted to provide the received information from the terminal to other terminals connected to the same access point.

In a further aspect, a method is provided of an access point in a wireless communication system. When the access point temporarily does not have an operational backhaul connection, the access point provides information cached by the access point to terminals connected to the same access point.

In a further aspect, an access point in a wireless communication system comprises a control unit adapted, when the access point temporarily does not have an operational backhaul connection, to control providing information cached by the access point to terminals connected to the same access point.

Any of the aspects described above or in the description may form the basis of a separate implementation of the invention, independently or in combination with other features. For example, any of the aspects described above may define an independent claim.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the concept described herein. However, it will be apparent to those skilled in the art that the described concept may be practiced in other embodiments that depart from these specific details. That is, those skilled in the art will be able to devise various arrangements which, although not explicitly described or shown herein, embody the principles of the described concept and are included within its spirit and scope. In some instances, detailed descriptions of well-known devices, circuits, and methods are omitted so as not to obscure the description according to the present concept with unnecessary detail. All statements herein reciting principles, aspects, and embodiments of the described concept, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as e.g. "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to Application Specific Integrated Circuit(s) (ASICs), and (where appropriate) state machines capable of performing such functions.

The herein suggested technology may be referred to as a "black box service" and relates to functionalities for i) base stations, or radio access points in general, that has temporarily lost their connection to the rest of the communication network. This could be referred to as that these base stations or other radio access points are "off-line", or as that they have no operational backhaul communication or link.

ii) "users", i.e. UEs, terminals, etc. in general, being in or passing through the service area of the particular base station being temporarily off-line. The term "terminal" will be used as a general term for a device connectable to an access point (e.g. base station). In some examples, the terminal is a user equipment.

Once a base station is off-line, the base station could start to advertise and/or apply the black box service (BBS). The BBS service may relate to one or more of the following:

1) Store data, e.g. users initiated traffic data, and forward the stored data to the network once the network connection is restored, or, when the network connection is not restored, e.g. within a predefined time:

2) rely on users/user devices, passing through the service area of the base station, to bring the stored data to another base station in operation, i.e., an "on-line" base station or other access point. This latter option could be especially relevant, e.g., in emergency situations. One or several users/user devices inside the coverage area of the disconnected base-station may then be given the task to forward a message whenever they make contact with another base station in the network, which message may be e.g. an encrypted special message; or 3) rely on other types of mechanical relaying for forwarding the data to a service area of an on-line access point. For example, such mechanical relaying could be achieved e.g. by the launching of an emergency rocket, a balloon or messenger equipment comprising a communication device or having a communication device attached thereto. The communication device should be capable of forwarding a recorded emergency message or other stored data to another network or network node; or 4) provide local connectivity during the temporary connection loss, e.g. allowing a user in distress to send out an emergency message, possibly including a recorded voice message or a text message together with associated location and time information, to all users connected to the same base-station, or 5) provide cached information, such as e.g. news and weather information, to users during the temporary connection loss.

Figure 1:
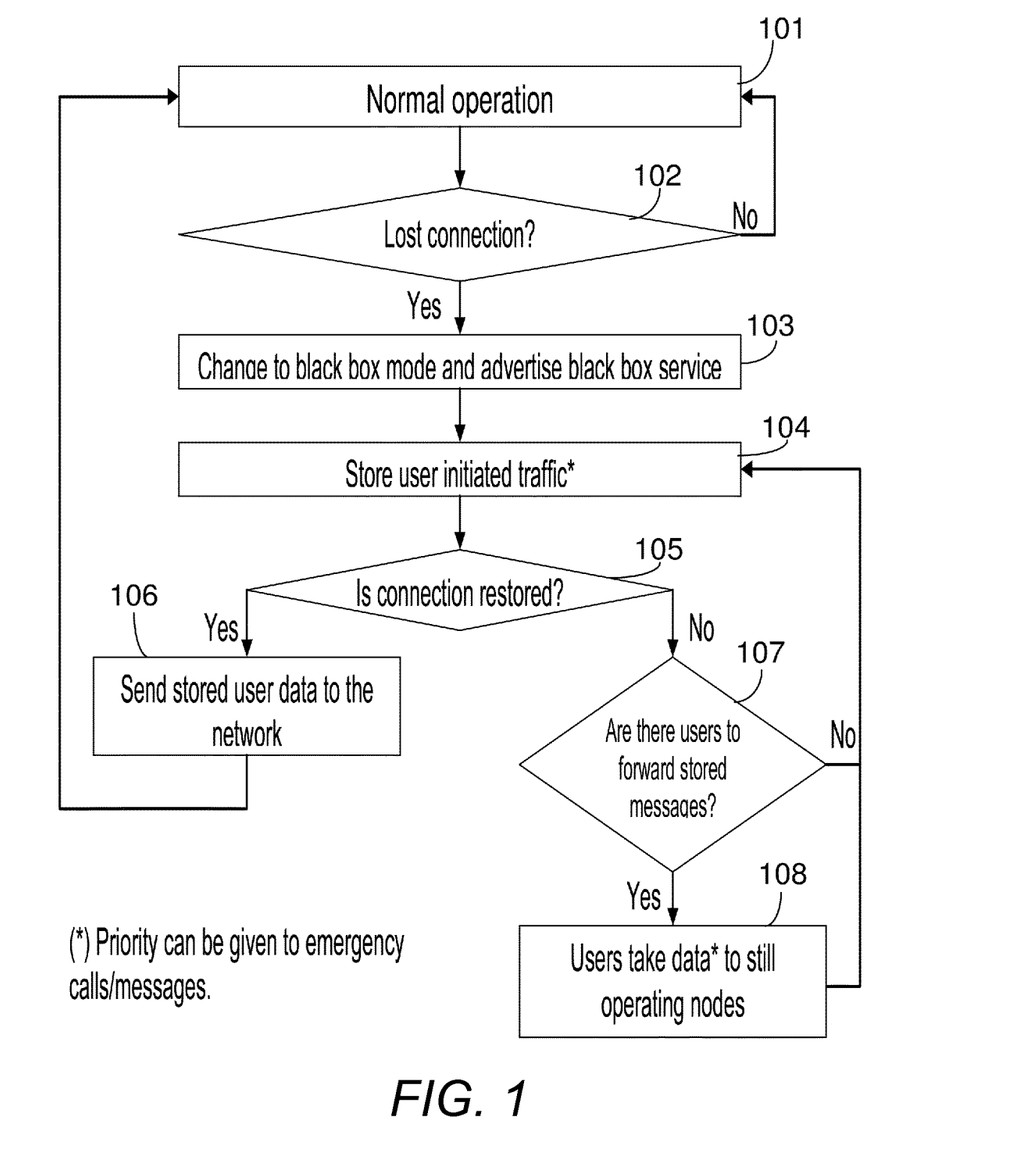
FIG. 1-7 illustrate exemplifying embodiments of a procedure according to the herein suggested technology.

A flowchart of a base station operation in accordance with an exemplifying embodiment of the herein suggested technology is depicted in FIG. 1. Further exemplifying embodiments are depicted in FIGS. 2-5.

FIG. 1 illustrates a procedure in a base station or other access point, henceforth denoted "base station". The base station is assumed to be connected to the network via a backhaul link. The base station is further assumed to be relatively isolated in the sense that there is no or little overlapping coverage between the service area, or cell, of the base station and service areas, cells, of other base stations.

The normal operation of the backhaul link and base station is illustrated as the state 101. When the connection to the network is lost, e.g. by a dysfunctional backhaul link, this is detected in an action 102. The base station may then enter a "black box mode", which may alternatively be denoted "off-line mode" or "relaying mode". This is illustrated as an action 103 in FIG. 1. User initiated information, or data, is received e.g. from a UE A and stored 104 in a memory. This data may be related to an emergency situation and comprise emergency information. This data would normally be conveyed via the backhaul link. However, when the base station is in black box mode, there is no backhaul link in operation. Before taking any further measures, it could be determined, e.g. in an action 105, whether the connection is restored or not within a predefined period of time. This may be performed in order to avoid black box operations in cases where the connection to the core network is down only for a short period of time.

When the connection is not restored, e.g. within a predefined period of time, it may be determined in an action 107, whether there are any users, i.e. user equipments (UEs), other than UE A, connected to the base station. If there are one or more UEs connected to the base station, the stored data may be transmitted to one or more of these UEs for mechanical relaying 108 to a service area of a another base station (cell), which is "on-line" i.e. has a working connection to the core network.

By mechanical relaying is here meant that the UE receives the data, and stores or otherwise carries it until the UE arrives in a location within the service area of another base station (cell) with which it may communicate, and then forwards or delivers, i.e. transmits, the data to this other base station (cell), thus having mechanically relayed it. The other base station (cell) could be of the same type as the off-line base station in the same network, or belong to another network, utilizing e.g. another radio access technology and/or managed by a different operator.

Figure 2:
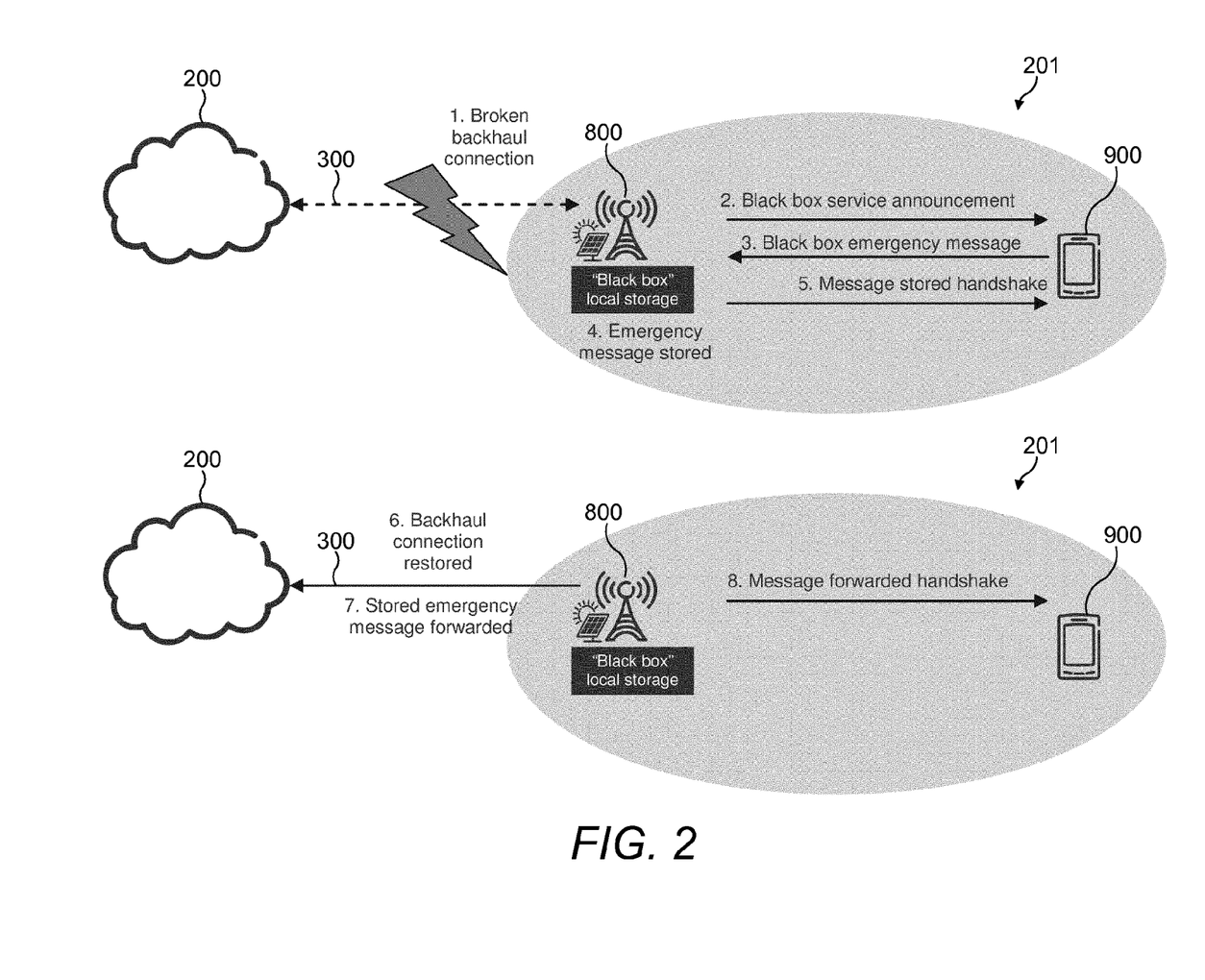
Figure 3:
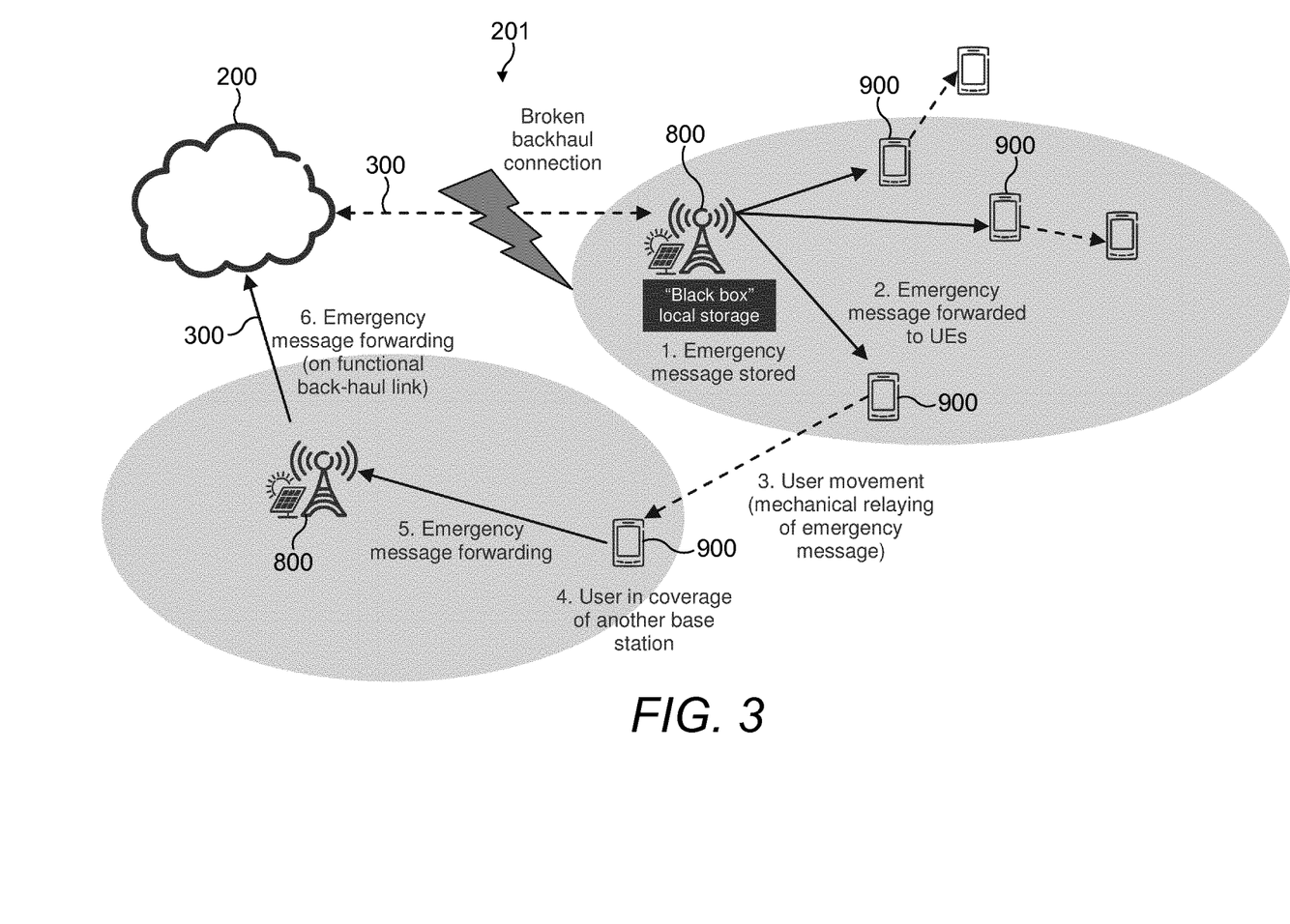

As an alternative to mechanical relaying by use of one or more UEs, e.g. if there are no UEs in the service area of the off-line base station, there are other possible ways to achieve mechanical relaying of the data. For example, a communication device may be launched, e.g. attached to a projectile, or otherwise ejected from the base station site in a direction. The communication device should be provided with the data to be relayed and capable of communicating the data to a remote network node having a service area in which the communication device enters, e.g. passes or lands BBS Service An exemplifying functionality for providing BBS service is illustrated in FIG. 2. First, the base station, or other radio access point 800, etc., should be capable to store user initiated data, see action 3 in FIG. 2, when the backhaul connection is broken for any reason, see action 1 in FIG. 2. Action 1 illustrates a temporary loss of operation of a backhaul connection 300 of the access point (broken backhaul connection) to the core network 200. Action 3 is a providing of information, e.g. an emergency message, from the terminal 900 (e.g. user equipment) to the access point. The access point 800 can be considered as a part of a wireless communication system 201.

The base station should be kept in operation and should have reserved data storage capacity for storing user data. The UEs in the service area of the base station could be informed about the situation e.g. by an announcement of BBS service, action 2 in FIG. 2. Note that in case of limited data storage capacity, emergency related messages or other priority reasons should be taken into account. Once a UE receives the BBS service announcement, its communication optionally could be limited to emergency messages, action 3 in FIG. 2. If UEs are not limited to emergency messages, the system may in some situations not be able to guarantee that all messages could be stored by the base station. The base station may store the received messages locally, action 4 in FIG. 2 and inform the senders about the receipt of the message, action 5 in FIG. 2.

If the backhaul connection is restored e.g. within a predefined time, action 6 in FIG. 2, the base station may forward some or all the stored messages, action 7 in FIG. 2 and may inform the corresponding UEs about the delivery, action 8 in FIG. 2. However, if the backhaul is not restored within the predefined time, other measures may be taken, which will be described below.

Mechanical Relaying by UE

The basic functionality for providing BSS service described above can be extended to rely on users with UEs passing through its service area to bring the stored data to another base station in operation, i.e., not an off-line base station. Once the base station has stored the received messages locally, action 4 in FIG. 2 and action 1 in FIG. 3, it may forward the message to one, some or all UEs 900 connected to this off-line base station having a non-functioning backhaul link, see action 2 in FIG. 3. The message may be encrypted. In some examples, the message may be an emergency message. Relying on the movement of these users and their UEs, the UEs can perform mechanical relaying to a service area of another base station with a functional backhaul, see action 3 and 4 in FIG. 3. Once such a UE is in the coverage area of a fully functional base station 800 (having a connection 300 to the core network) 200, this user forwards the message to this functional base station, action 5 in FIG. 3. Finally this functional, on-line, base station 800 delivers the message via the backhaul link and core network, see action 6 in FIG. 3. This embodiment could be especially relevant, e.g., in emergency situations.

Other Mechanical Relaying

In addition to or as an alternative to mechanical relaying by UEs, described above, the BSS services may rely not only on users, but to other types of mechanical relaying. Other types of mechanical relaying could be achieved e.g. by launching of a communication device 400, e.g. attached to an emergency rocket or a balloon. The communication device should be capable of forwarding, conveying, a recorded emergency message or other message or data to another network node. That is, once the base station has received, and possibly stored, the messages locally, see action 4 in FIG. 2 and action 1 in FIG. 3 or FIG. 4, it forwards the message to another base station with a functional backhaul, see action 2 in FIG. 4, with the help of a relaying device or "messenger" 401, such as a communication device attached e.g. to a rocket 402, balloon or airplane, etc. Once the relaying device is in the coverage area of the fully functional base station, the relaying device forwards the message to this base station (having a functional backhaul link), action 3 in FIG. 4. Finally this base station delivers the message via the backhaul link and network, action 4 in FIG. 4. This option could be especially relevant, e.g., in emergency situations.

Figure 5:
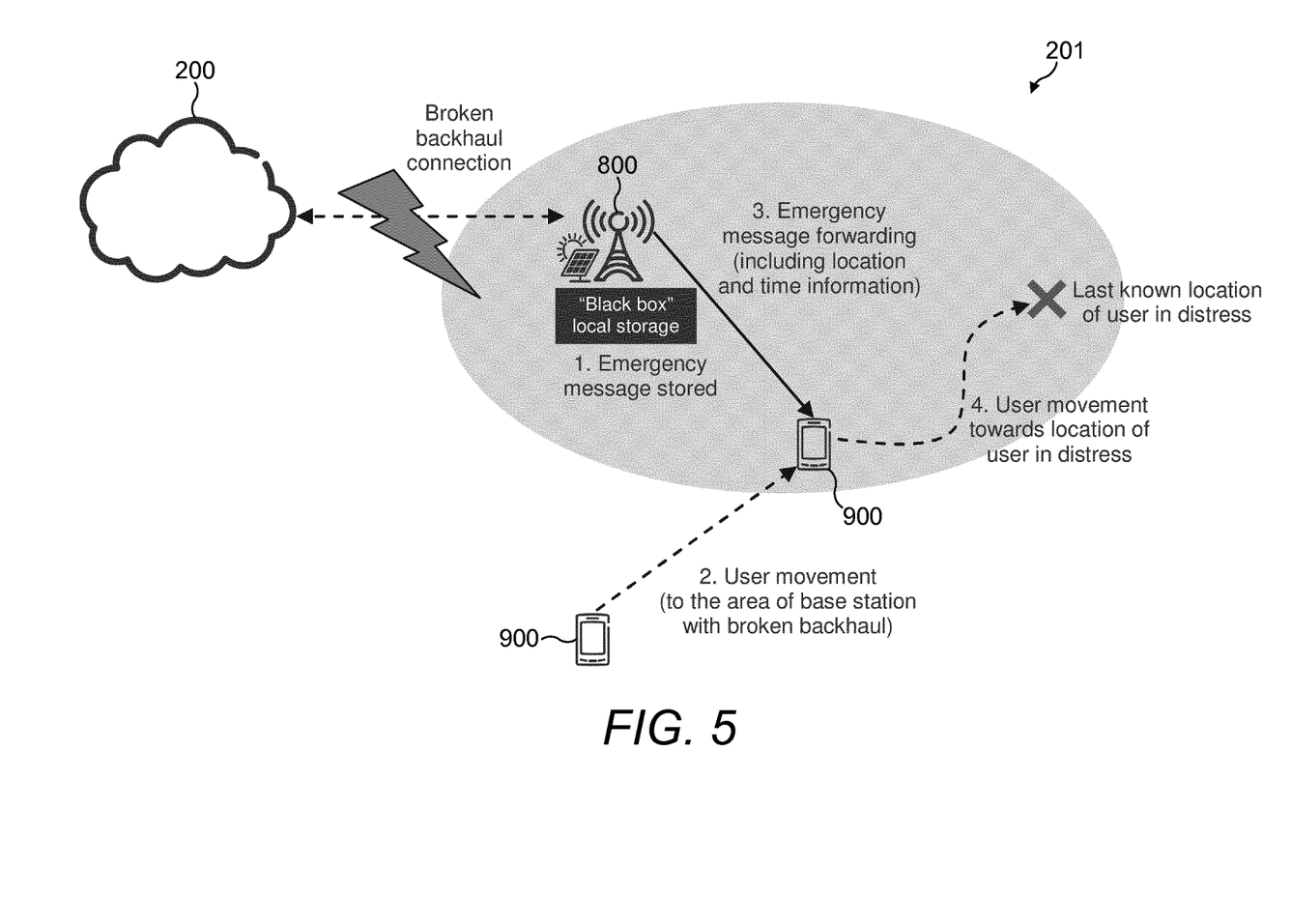

Example in FIG. 5

As an extension to the mechanical relaying described above, the BSS services may allow users in distress to send out an emergency message, possibly including a recorded voice message or a text message together with associated location and time information, see action 3 in FIG. 2, to all users connected to the same base station (i.e., a local connectivity is still provided by the base station). That is, once the base station 800 has received and possibly stored the message, the base station sends out this message or information to new and existing, e.g. all, UEs 900 in the cell (possibly except the one that sent the emergency message) (see action 2 and 3 in FIG. 5). For example, FIG. 5 shows a UE (terminal) 900, which by user movement, enters the service area of the access point 800 with a temporary loss of backhaul connection. The emergency message received by the access point 800 is forwarded to the new (and existing) UEs. Once these users of these UEs 900 detect the emergency call, they can find the user in distress and help to rescue him/her (see action 4 in FIG. 5).

Caching of Popular Information

The local connectivity provided by the base station with temporary backhaul connection loss can be used to provide cached information of typical/main interest of users such that the quality of experience can be kept on an acceptable level for the most of the users. That is, the base station could be aware of the most popular applications/information the users are requesting in its serving area and can cache relevant information like news and weather information, etc., such that, if there are any backhaul connectivity problems, the base station could still provide the most popular information to the users.

Figure 6:
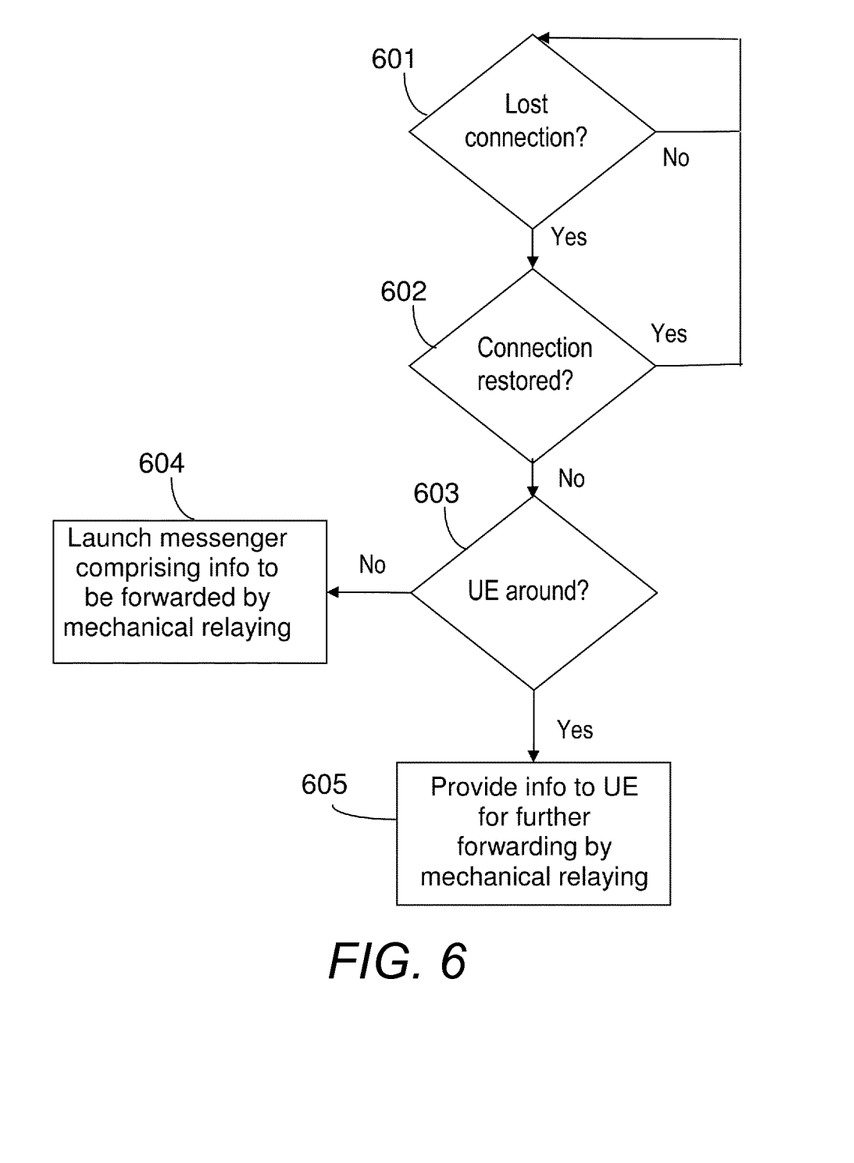

Exemplifying Procedure in a Network Node (Access Point), FIG. 6.

An exemplifying procedure in a network node in a wireless communication system 201, such as an eNB in an LTE-type system, will be described with reference to FIG. 6. The network node will be denoted base station below. It is assumed that the base station is located in relative isolation, i.e. that it has no or very limited overlap with service areas of other base stations.

In FIG. 6, it is determined in an action 601 whether the connection to the core network is lost. For example, the capacity or other characteristics of the backhaul link may be monitored, and when the monitored characteristic fulfills a predefined criterion, the connection is determined to be lost. When the connection is lost, it may optionally be determined in an action 602, whether the connection is restored e.g. within a predefined time period or interval. When the connection is lost, e.g. still after the optional predefined time interval, it may be determined in an action 603 whether there are any UEs in the service area of the base station, which may serve as mechanical relays.

If there are no such UEs around, a relaying device or "messenger" could be launched from the base station site in an action 604. The relaying device should comprise a communication device, capable of forwarding information, such as e.g. an emergency message to another, fully operational (including backhaul) base station, as previously described.

If there are UEs around, i.e. in the service area of the base station, connected to the base station, information such as an emergency message could be transmitted to one or more of these UEs in an action 605. The one or more UEs could store the information and carry it until it/they enter the service area of another, fully operational (including backhaul) base station, to which the information is forwarded, as previously described.

Figure 8:
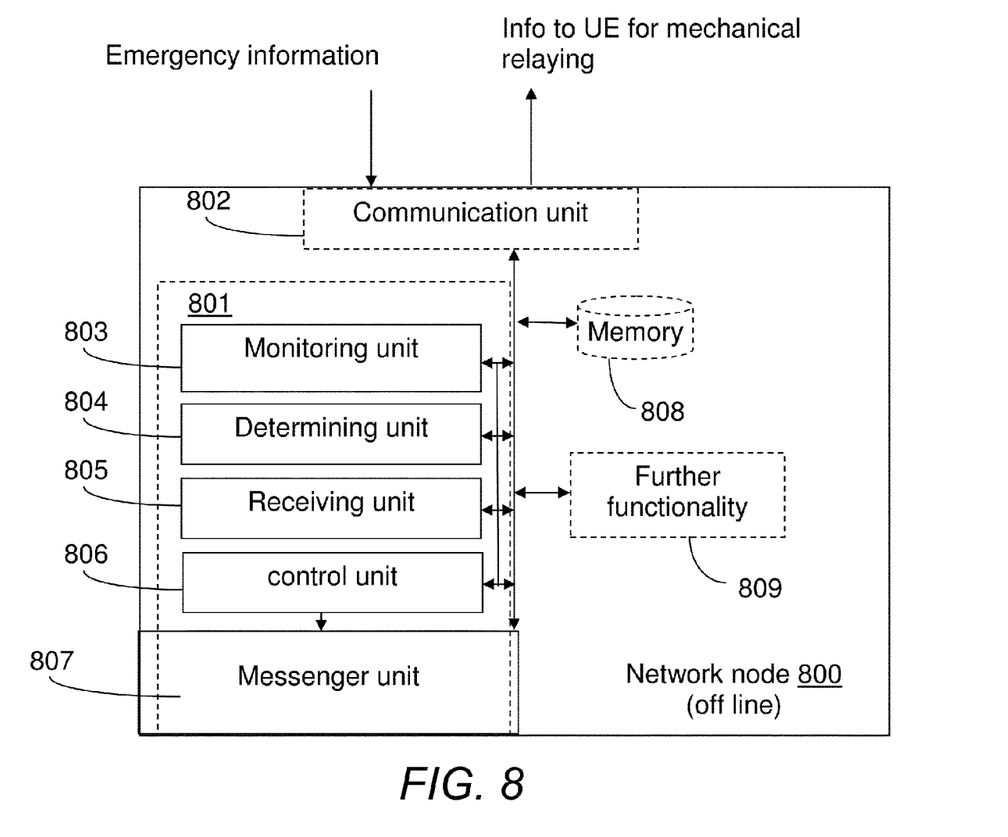
FIGS. 8 and 9 are block charts, illustrating arrangements 801 and 901 in nodes, 800 and 900, according to different exemplifying embodiments.

Exemplifying Network Node, FIG. 8

A network node according to an exemplifying embodiment will now be described with reference to FIG. 8. The network node is operable to serve UEs, such as e.g. cell phones, tablets, navigation systems or any other devices capable of communication and of connecting to an access point. The network node may be a base station in a wireless communication system, such as GSM, UMTS, E-UTRAN or CDMA 2000. The network node will henceforth be denoted base station.

The part of the base station which is mostly related to the herein suggested technology is illustrated as an arrangement 801 surrounded by a broken line. The arrangement and possibly other parts of the base station are adapted to enable the performance of one or more of the procedures described above and illustrated e.g. in FIGS. 1-6. The base station 800 is illustrated as to communicate wirelessly with other entities via a communication unit 802, which may be considered to comprise conventional means for wireless communication in accordance with a standard within which the base station is operable. The arrangement and/or base station may further comprise other functional units 809, for providing e.g. regular base station functions, such as e.g. serving mobile terminals, and further for providing communication over a backhaul link. The arrangement and/or node may further comprise one or more storage units 808.

The arrangement 801 and other parts of the base station could be implemented e.g. by one or more of: a processor or a micro processor and adequate software and storage therefore, a Programmable Logic Device (PLD) or other electronic component(s)/processing circuit(s) configured to perform the actions mentioned above.

The arrangement may be implemented and/or schematically described as follows. The arrangement 801 may comprise a monitoring unit 803, adapted to monitor the state and/or current characteristics of the backhaul link, i.e. the connection to the core network. The monitoring could be achieved by polling a part of the base station responsible for communicating over the backhaul link, or, an indication could be received when the connection to the core network fulfils any predefined criteria. The arrangement 801 may further comprise a determining unit 804, adapted to determine, e.g. based on information from the monitoring unit 803, whether the connection to the core network is broken or otherwise dysfunctional, and that the base station thus should enter an off-line mode, such as the earlier described BSS mode.

The arrangement may further comprise a receiving unit 805 for receiving information from a served UE when the network node is in an off-line mode. The information may further be stored in a storage unit, such as memory 808 or any other memory comprised in the arrangement 801. The received information may be related to an emergency situation, and comprise voice and/or text messages and/or information on the location of the UE. The determining unit 804, or another determining unit comprised in the base station, may further be adapted to determine whether any further UEs are connected to the base station, which may serve as mechanical relays. The arrangement 801 may further comprise a control unit 806, adapted to control the provision of the received, and possibly stored, information to one or more such further UEs, when there are one or more further UEs connected to (served by) the base station.

Figure 4:
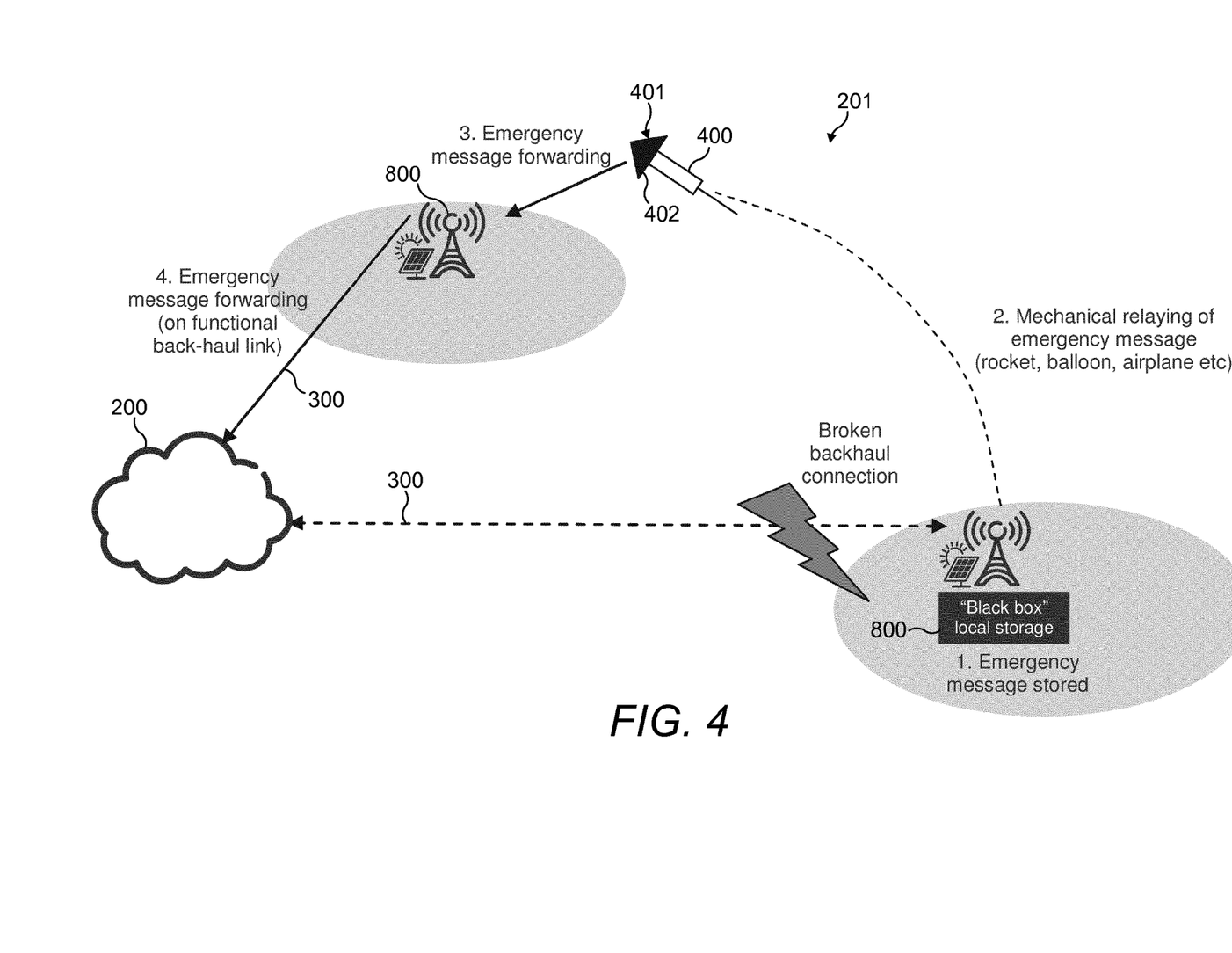

Alternatively or in addition, the control unit 806 may be adapted to trigger the launching of a messenger, e.g. as illustrated in FIG. 4. In this case, the arrangement may comprise a messenger unit, adapted to launch a messenger comprising a communication device capable of forwarding the information to a remotely located base station or other access point, as previously described. The messenger unit may be integrated with the base station, or located externally at the base station site (in connection with the base station)

Figure 7:
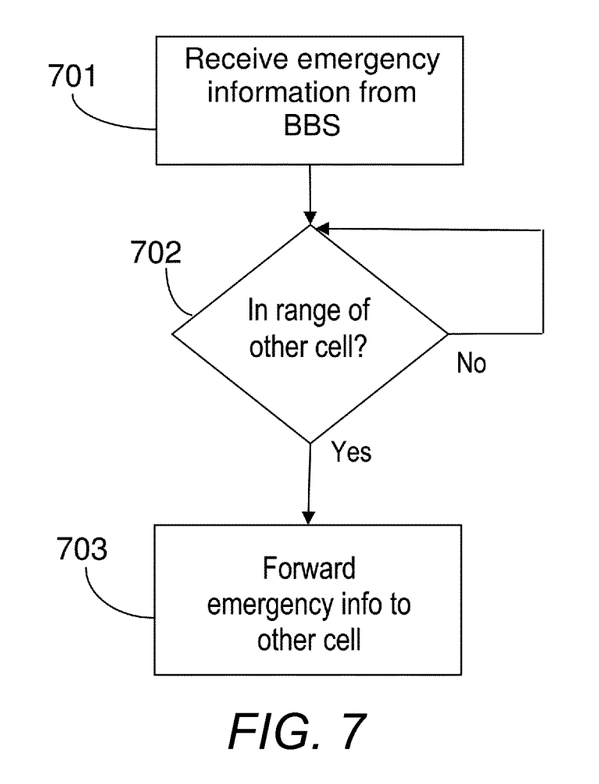

Exemplifying Procedure in a UE, FIG. 7

An exemplifying procedure in a UE will be described below with reference to FIG. 7. The UE is assumed to (initially) be served by a base station, which enters an off-line mode. The UE receives information from the off-line base station in an action 701. The information may be emergency information. The information may e.g. have a certain format or be associated with any other indicator, indicating that the information should be forwarded according to a procedure. The information is kept, possibly stored, in the UE for further use (not illustrated in FIG. 7). The UE is then assumed to move geographically, carried by a user and/or vehicle. While moving, the UE determines, in an action 702, whether it has entered the service area of another base station. The determining 702 may be performed with predefined time intervals, or, a continuous monitoring may be performed. When it is determined in action 702 that the UE has entered a service area (cell) of another base station, the previously received information is forwarded to the new base station in an action 703.

When the UE receives information from an off-line base station for mechanical relaying, the user of the UE could be notified, e.g. by means of an SMS, an icon in the display, a sound message, a vibration signal, a status flashing light, and/or by some other suitable indication. The user could also be allowed to reject the use of her/his UE for mechanically relaying a message.

Figure 9:
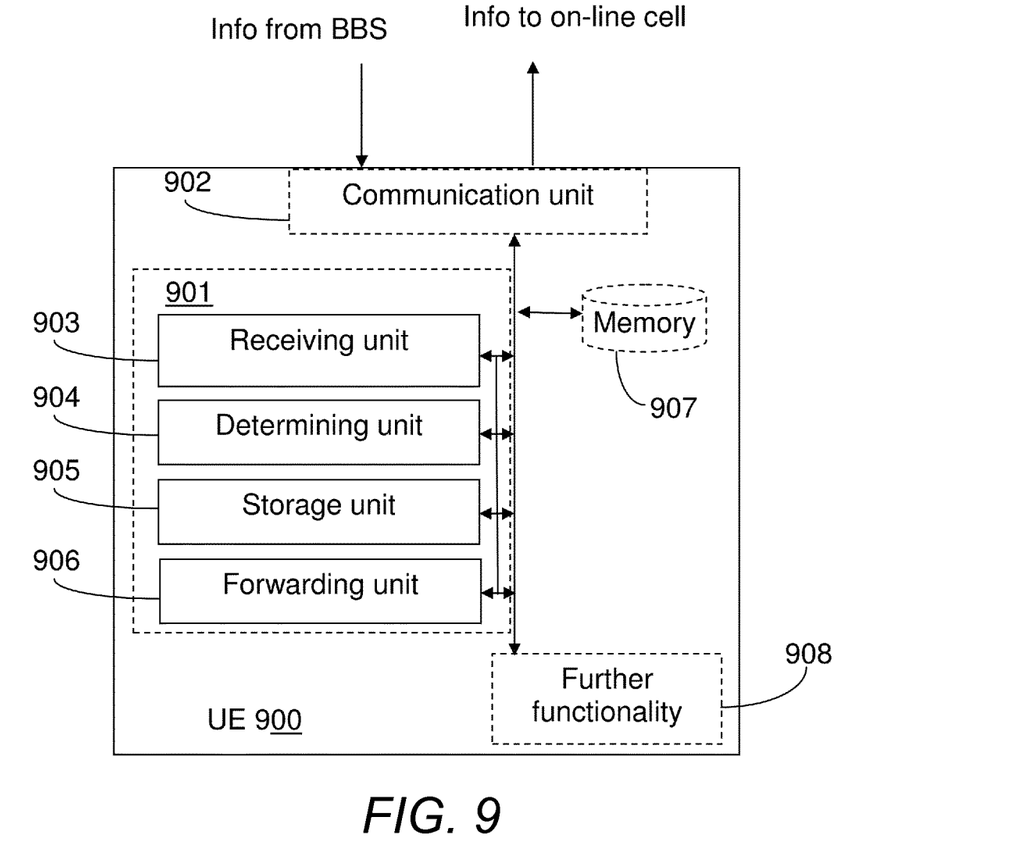

Exemplifying UE, FIG. 9

A UE according to an exemplifying embodiment will now be described with reference to FIG. 9. The UE is operable to communicate with and to connect to an access point in a wireless communication network. The UE may be operable in a wireless communication system, such as GSM, UMTS, E-UTRAN or CDMA2000.

The part of the UE which is mostly related to the herein suggested technology is illustrated as an arrangement 901 surrounded by a broken line. The arrangement and possibly other parts of the UE are adapted to enable the performance of one or more of the procedures described above and illustrated e.g. in FIGS. 2-5 and 7. The UE 900 is illustrated as to communicate wirelessly with other entities via a communication unit 902, which may be considered to comprise conventional means for wireless communication in accordance with a standard within which the UE is operable. The arrangement and/or UE may further comprise other functional units 909, for providing e.g. regular UE functions, such as e.g. signal processing and user interaction. The arrangement and/or UE may further comprise one or more storage units 908.

The arrangement 800 and other parts of the base station could be implemented e.g. by one or more of: a processor or a micro processor and adequate software and storage therefore, a Programmable Logic Device (PLD) or other electronic component(s)/processing circuit(s) configured to perform the actions mentioned above.

The arrangement may be implemented and/or schematically described as follows. The arrangement 901 may comprise a receiving unit 903, adapted to receive information, e.g. in form of a message, from the serving base station. The information may have a certain format or be associated with some indicator enabling the UE to conclude that the information is to be treated according to a predefined procedure. The arrangement may further comprise a storage unit 905 adapted to store the received information. The arrangement may further comprise a determining unit 904, adapted to determine whether the UE has entered the service area of another base station, with which it is able to communicate. The arrangement may further comprise a forwarding unit 906, adapted to forward the previously received information to a (new) base station, the service area of which the UE has entered.

Figure 10:
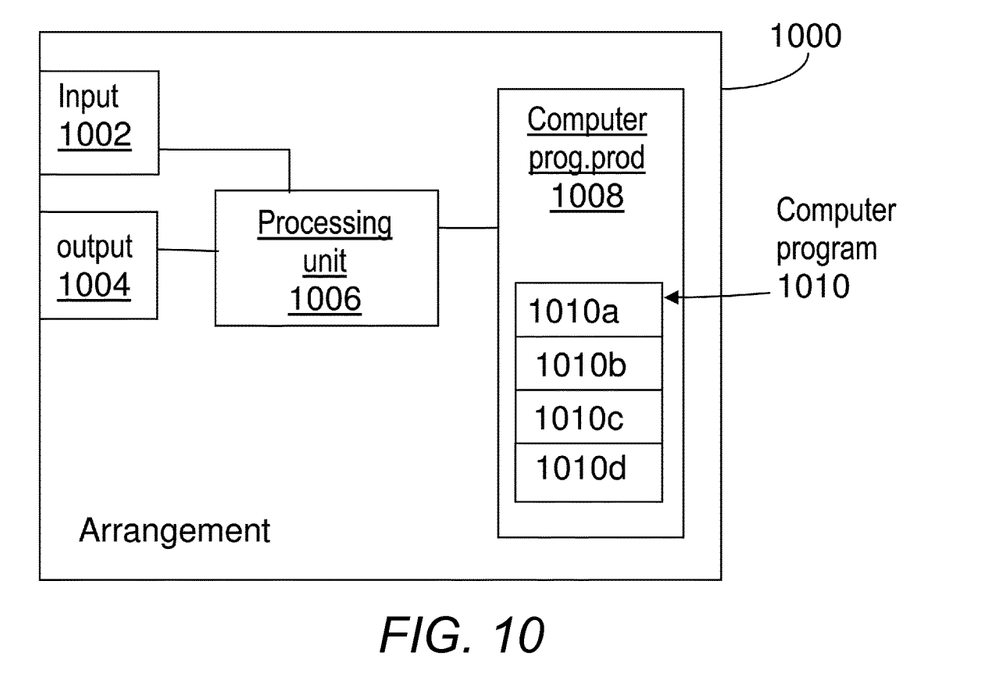
FIG. 10 is a block chart illustrating an arrangement according to an exemplifying embodiment.

Arrangement, FIG. 10

FIG. 10 schematically shows an embodiment of an arrangement 1000 in a network node, which also can be an alternative way of disclosing an embodiment of the arrangement in a mobile terminal illustrated in FIG. 6. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile or volatile memory, e.g. an EEPROM (Electrically Erasable Programmable Read-Only Memory), a flash memory and/or a hard drive. The computer program product 1008 comprises a computer program 1010, which comprises code means, which when executed in the processing unit 1006 in the arrangement 1000 causes the arrangement and/or the network node to perform the actions e.g. of any of the procedure described earlier in conjunction with FIGS. 4a-4c.

The computer program 1010 may be configured as a computer program code structured in computer program modules. Hence, in an exemplifying embodiment, the code means in the computer program 1010 of the arrangement 1000 may comprise a monitoring module 1010a for monitoring the state or condition of the backhaul connection. The computer program may further comprise a determining module 1010b for determining when the base station should enter an off-line mode, based on the received information. The computer program 1010 may further comprise a receiving module 1010c for, when the base station is in an off-line mode, receiving data, such as emergency information from a UE within the service area of the base station. The computer program 1010 could further comprise a control module 1010d for controlling the providing of the received data to a mechanical relay, such as a UE in the service area or a separate communication unit as described above.

The modules 1010a-d could essentially perform, at least part of, the actions indicted in FIGS. 1, 3-4 and 6, to emulate the arrangement in a network node, illustrated in FIG. 8. In other words, when the different modules 1010a-d are executed in the processing unit 1006, they may correspond to the units 803-806 of FIG. 8.

Although the code means in the embodiment disclosed above in conjunction with FIG. 10 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

In a similar manner, an exemplifying embodiment comprising computer program modules could be described as an alternative implementation of the arrangement in a UE, illustrated in FIG. 9.

It is to be understood that the choice of interacting units or modules, as well as the naming of the units are only for exemplifying purpose, and client and server nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

By use of the herein suggested technology, an emergency message sent to a base station may be forwarded to the network also when the base station is in off-line mode, i.e. when the base station has no functioning backhaul communication via a backhaul link. For example, a person in a distress can send an emergency message to a base station and reach through to the network, even if the base station is currently not able to forward the message via a backhaul link. This enables normal cellular systems to fulfill requirements associated with a NSPS system.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby. The claimed invention may refer to any combination of features, and any particular feature should not be considered as essential, e.g. mechanical relaying.

ABBREVIATIONS

BBS: Black Box Service
NSPS National Security and Public Safety
OSS: Operation and Support System

The invention claimed is:

1. A method of a first access point providing service to a first service area in a wireless communication system, wherein, when the first access point temporarily does not have an operational first backhaul connection, the method comprises:
   receiving, by the first access point, information from a first user equipment,
   determining, by the first access point, that the first backhaul connection of the first access point has been not operational for a predefined period of time,
   in response to determining that the first backhaul connection has been not operational for the predefined period of time, transmitting, by the first access point, a black box service message to a plurality of user equipments within a service area of the first access point to identify a second user equipment, and
   providing, by the first access point, the information from the first user equipment to the second user equipment, the second user equipment operating as a messenger for mechanical relaying to a second service area of a second access point having an operational second backhaul connection.

2. The method as claimed in claim 1 wherein the information provided to the messenger is encrypted.

3. The method as claimed in claim 1, further comprising:
   storing user initiated data when the first access point temporarily does not have the operational first backhaul connection, and when the operational first backhaul connection is restored, forwarding some or all of the stored messages using the first backhaul connection.

4. The method as claimed in claim 1, wherein when the access point temporarily does not have the operational first backhaul connection, the method further comprises providing local connectivity to user equipments connected to the same access point.

5. The method as claimed in claim 1, further comprising providing the received information from the first user equipment to other user equipments connected to the first access point.

6. The method as claimed in claim 1, further comprising providing information cached by the first access point to other user equipments connected to the first access point.

7. A computer program product, comprising a computer program stored in a non-transitory computer readable medium, which when executed by a processor, causes the first point to perform the method according to claim 1.

8. A first access point providing service to a first service area for a wireless communication system, the first access point comprising:
　a receiver arranged to receive information from a first user equipment, and
　a processor operable to:
　　determine that the first backhaul connection of the first access point has been not operational for a predefined period of time;
　　in response to determining that the first backhaul connection has been not operational for the predefined period of time, transmit a black box service message to a plurality of user equipments within a service area of the first access point to identify a second user equipment; and
　　provide the information to the second user equipment, the second user equipment operating as a messenger for mechanical relaying to a second service area of a second access point having an operational second backhaul connection.

9. The access point as claimed in claim 8 wherein the information provided to the messenger is encrypted.

10. The first access point as claimed in claim 8 comprising a storage unit for storing user initiated data when the first access point temporarily does not have an operational first backhaul connection, and
　when the first backhaul connection is restored, the first access point is adapted to forward some or all of the stored messages using the first backhaul connection.

11. The first access point as claimed in claim 8, wherein when the first access point temporarily does not have an operational first backhaul connection, the control unit is adapted to control providing local connectivity to other user equipments connected to the first access point.

12. The first access point as claimed in claim 8, wherein the control unit is adapted to control providing the received information from the first user equipment to other user equipments connected to the first access point.

13. The first access point as claimed in claim 8 wherein the control unit is adapted to control providing information cached by the first access point to other user equipments connected to the first access point.

14. A method performed by a first user equipment when served by a first point which temporarily does not have an operational backhaul connection, the method comprising:
　receiving, while the first user equipment is served by the first access point, a black box service message from the first access point, the black box service message identifying to a plurality of user equipments including the first user equipment that the first access point does not have the operational backhaul connection,
　receiving information from the first access point associated with a second user equipment,
　storing the information,
　determining that the first user equipment has entered a service area of a second access point, and
　transmitting the information associated with the second user equipment to the second access point.

15. A computer program product, comprising a computer program stored in a non-transitory computer readable medium, which when executed by a processor, causes a terminal to perform the method according to claim 14.

16. A first user equipment operable to be served by first point which temporarily does not have an operational backhaul connection, wherein the user equipment comprises:
　a receiver operable to:
　　receive, while the first user equipment is served by the first access point, a black box service message from the first access point, the black box service message identifying to a plurality of user equipments including the first user equipment that the first access point does not have the operational backhaul connection,
　　receive information from the first access point associated with the second user equipment,
　memory adapted to store the information,
　a processor adapted to determine that the first user equipment has entered a service area of a second access point, and
　a transmitter adapted to forward the previously received information associated with the second user equipment to the second access point.

* * * * *